United States Patent
Gao (10) Patent No.: US 6,990,926 B2
(45) Date of Patent: Jan. 31, 2006

(54) KNOCKDOWN CAGE

(76) Inventor: Taishan Gao, 6502 #C New London Rd., New Market, MD (US) 21774

( * ) Notice: Subject to any disclaimer, the term of this patent is extended or adjusted under 35 U.S.C. 154(b) by 0 days.

(21) Appl. No.: 10/661,501

(22) Filed: Sep. 15, 2003

(65) Prior Publication Data

US 2005/0056230 A1    Mar. 17, 2005

(51) Int. Cl.
*A01K 31/08*    (2006.01)
(52) U.S. Cl. .................. 119/461; 119/474; 119/499
(58) Field of Classification Search ................ 119/461, 119/471, 491, 492, 498, 499, 452–454, 459, 119/463, 512, 513, 472, 474; 403/353, 393; 446/111

See application file for complete search history.

(56) References Cited

U.S. PATENT DOCUMENTS

| | | | |
|---|---|---|---|
| 3,890,932 A * | 6/1975 | Sanzone et al. | 119/498 |
| 4,901,672 A * | 2/1990 | Rosenberger | 119/498 |
| 5,000,121 A * | 3/1991 | Daily | 119/461 |
| 5,281,185 A * | 1/1994 | Lee | 446/488 |
| 5,353,738 A * | 10/1994 | Chiu | 119/461 |
| 5,452,681 A * | 9/1995 | Ho | 119/498 |
| D426,035 S * | 5/2000 | Huang | D30/119 |
| 6,129,052 A * | 10/2000 | Huang | 119/461 |
| 2002/0088409 A1 * | 7/2002 | Huang | 119/459 |

* cited by examiner

*Primary Examiner*—Teri Pham Luu
*Assistant Examiner*—Susan C. Alimenti
(74) *Attorney, Agent, or Firm*—Jones,Tullar&Cooper, PC (57) ABSTRACT

A cage, such as a bird or other animal cage, incorporates a number of integral fastening elements that facilitate assembly of vertical side panels and top panels of the cage without the use of hand tools. Pin and aperture fastening elements are combined with headed pin and keyhole slot fastening elements to facilitate attachment of adjacent panels to one another. U-shaped locking clips are also employed to insure that the assembled side panels cannot move vertically relative to one another. The top assembly of the cage uses tab and slot type and U-shape clip type fastening elements to facilitate assembly.

20 Claims, 8 Drawing Sheets

KNOCKDOWN CAGE

BACKGROUND OF THE INVENTION

The present invention relates in general to a cage that can be stored or transported in a collapsed condition but can be quickly assembled for use without the need of screw drivers, wrenches or other hand tools.

Manufacturers of animal cages, such as bird cages, typically sell the cages to wholesalers or retailers in an unassembled condition, since they take up too much space if stored or shipped already assembled. Unfortunately, assembly of one of these "knockdown" type cages can be a time consuming, tedious task requiring the use of hand tools to secure the various cage panels together with a large number of screws, bolts, nuts or other fasteners.

To address the foregoing issue, Applicant devised a folding cage arrangement that is disclosed in Applicant's prior patent, U.S. Pat. No. 6,550,424, which issued on Apr.22, 2003. The disclosed folding cage employs a specially designed hinging system that allows the cage side panels to fold to a collapsed condition for storage or shipping, and to then be unfolded and secured to an open position without the need for any type of fastening means. In addition to the folding side panel assembly, the cage includes removable top and bottom panels or assemblies which, when secured to the folding side panel assembly, maintain the same in an open, unfolded position. The top section is positioned by means of a group of vertical pins extending from the top frame members of the side panel assembly and a plurality of corresponding apertures in the top section. In addition, the bottom frame panel is positioned within a lower horizontal frame section of the unfolded side panel assembly and is held in position by a plurality of L-shaped clips that are permanently attached to the bottom frame panel and have ends that rest on top of the horizontal frame tubes of the side panel assembly. Once the top section and the bottom frame panel are in position, gravity holds them in place and the side panel assembly is thus secured in its open position, thereby also eliminating the need for any type of latching mechanism.

Although the folding cage disclosed in the '424 patent can be easily assembled, the use of the special hinges and other elements add substantially to the manufacturing costs of the cage. Conventional knockdown cages are less costly, but until now, a need has remained for knockdown cages, which like the patented folding cage, can be readily and quickly assembled with out the use of hand tools and large quantities of fasteners.

SUMMARY OF THE INVENTION

The present invention fulfills the forgoing need through provision of a cage of the knockdown type that incorporates a number of integral fastening elements that facilitate assembly of vertical side panels and top panels of the cage without the use of hand tools. The side panels are assembled to one another using a combination of fastening elements that rely only on the force of gravity to maintain adjacent panels assembled to one another, and do not require assembly and tightening of nuts, washers, bolts or screws, for example. More specifically, first and second of the side panels each have downwardly extending pins that are positioned at opposite bottom corners thereof. These pins are positioned to be received in corresponding apertured plates that extend in a generally horizontal direction from the inside legs of each of an adjacent third and a fourth of the vertical side panels. Pin and keyhole fasteners are also positioned near the top ends of the panels. Preferably, a headed pin, bolt, screw, or the like is permanently affixed to the vertical frame tubing of the first and second panels, each of which engages a corresponding vertical key slot that is cut in the vertical frame tubing of the adjacent third and fourth panels.

This arrangement enables each of the side panels to be secured to one another in the following manner. First, one of the depending pins on the first panel is partially inserted into the corresponding plate aperture on the adjacent third panel. Next, the headed pin near the top of the first panel is inserted into a large top portion of the key slot on the third panel and then the first panel is moved down relative to the third panel, thereby securing both the pin in the aperture and the headed pin in the key slot. It should be noted in this regard that the length of the depending pin is preferably selected to be long enough such that the pin can be partially inserted in the aperture when the headed pin is lined up with the top large portion of the key slot to assist in the panel assembly process.

Although the assembled panels will remain secured together as long as the cage is not lifted, U-shaped clips are inserted in parallel vertical slots in the vertical frame tubing of the adjacent panels, which prevent the adjacent panels from moving vertically relative to one another, thereby insuring that the panels will remain assembled even when the they are lifted.

The invention also preferably employs a unique arrangement for assembling a top assembly of the cage. In the preferred embodiment, the top assembly is formed in the shape of a half cylinder and includes rectangular base frame, first and second semicircular end panels and first and second curved top panels. Preferably, the first and second end panels are each pivotally attached to opposite ends of the base frame by means of hinges, which allow the panels to be folded down for shipping or storage and folded open for assembly. Each of the curved top panels includes a plurality of tabbed clips spaced along the bottom ends thereof which engage apertured tabs on the base frame. The top ends of the curved top panels engage slotted clip arrangements mounted to the top portions of the first and second end panels. Finally, a plurality of clamping fasteners secure the opposite top ends of the curved top panels to one another through use of wing nut and screw assemblies that can be tightened by hand. In addition, these assemblies serve a second function of supporting toy or other article hangers inside the top of the cage.

BRIEF DESCRIPTION OF THE DRAWINGS

The features and advantages of the present invention will become apparent from the following detailed description of a preferred embodiment thereof, taken in conjunction with the accompanying drawings, in which.

DETAILED DESCRIPTION OF A PREFERRED EMBODIMENT

Figures 1, 2:
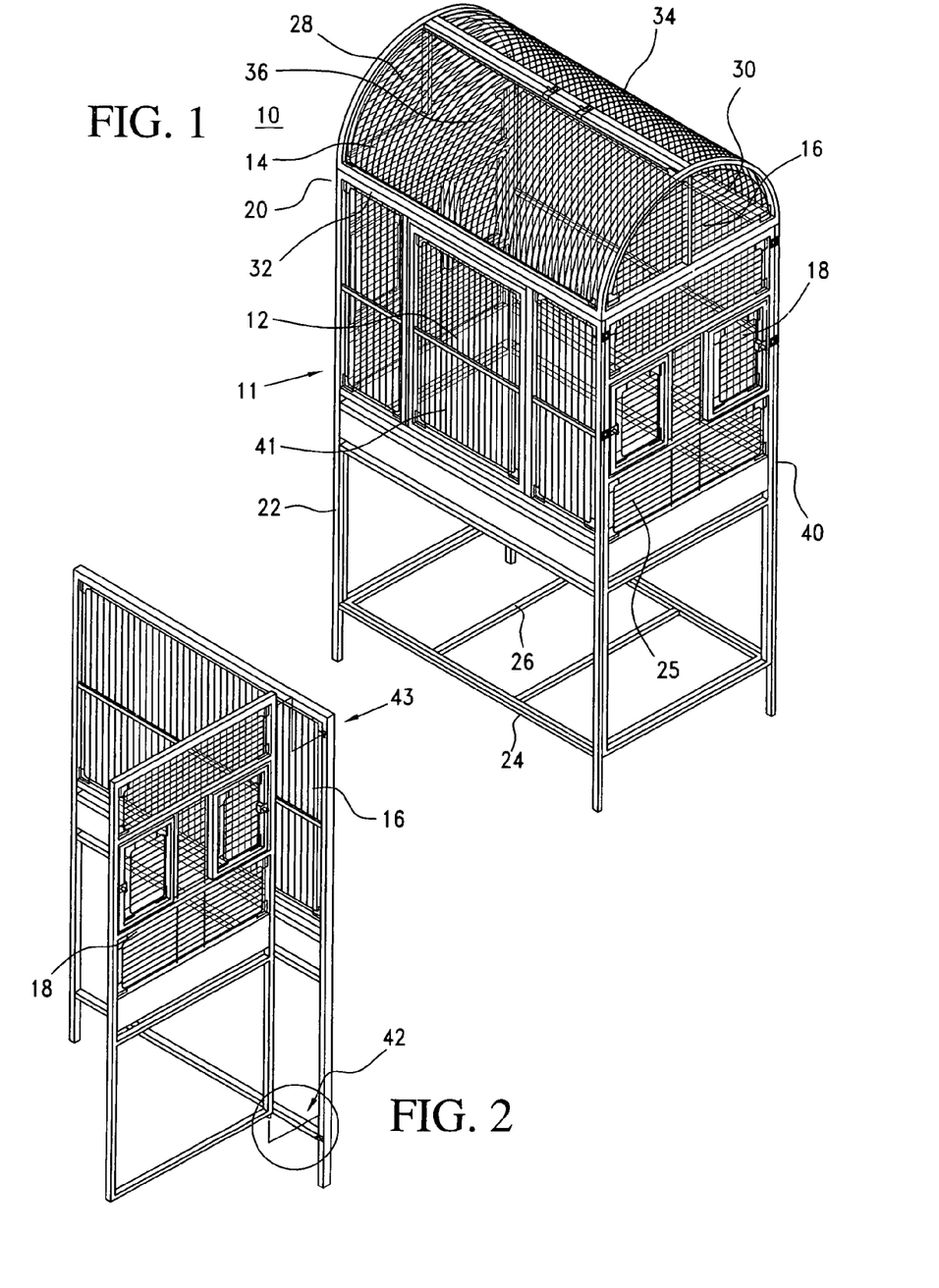
FIG. 1 is a perspective illustration of a partially assembled cage constructed in accordance with the preferred embodiment.
FIG. 2 is a perspective illustration of to side panels of the cage ready to being assembled to one another with a unique fastening arrangement in accordance with the preferred embodiment.

With reference to FIG. 1, a cage 10 is illustrated that is particularly designed for use as a birdcage, but could be used for containing other animals as well. The cage 10 is in some ways similar in design to the folding cage disclosed in the previously discussed U.S. Pat. No. 6,550,424, which is herby incorporated by reference. However, the cage 10 does not utilize a folding side panel assembly. Instead, the cage 10 includes a side panel assembly 11 in which four side panels are secured to one another using a unique arrangement of fasteners to be discussed in detail in conjunction with FIGS. 2–7. The side panel assembly 11 specifically includes a front panel 12, left side panel 14, back side panel 16 and right side panel 18. Integrally formed with each of the front and back side panels 12 and 16 are four support legs 20. Like the folding cage design in the '424 patent, a bottom frame panel 22 fits within a lower horizontal frame section 24 of the cage side assembly 11 when each of the side panels 12–18 is secured to one another. In addition, a cage floor panel 25 is supported by the side assembly 11 in the same manner set forth in the '424 patent.

The cage 10 also includes a domed top assembly 26 that is shaped in the form of a half cylinder and includes first and second semicircular end panels 28 and 30 that are pivotally attached to a rectangular base frame 32. First and second curved top panels 34 and 36 are secured to the end panels 28 and 30 and to the base frame 32 in a unique manner. The details of the top assembly are discussed later in conjunction with FIGS. 8–13.

As is conventional, each of the various panels or sections of the cage 10 is preferably constructed of lengths 40 of rectangular metal tubing which are welded together. Each panel or section also includes one or more groups of spaced cage bars or rods 41.

Figure 3:
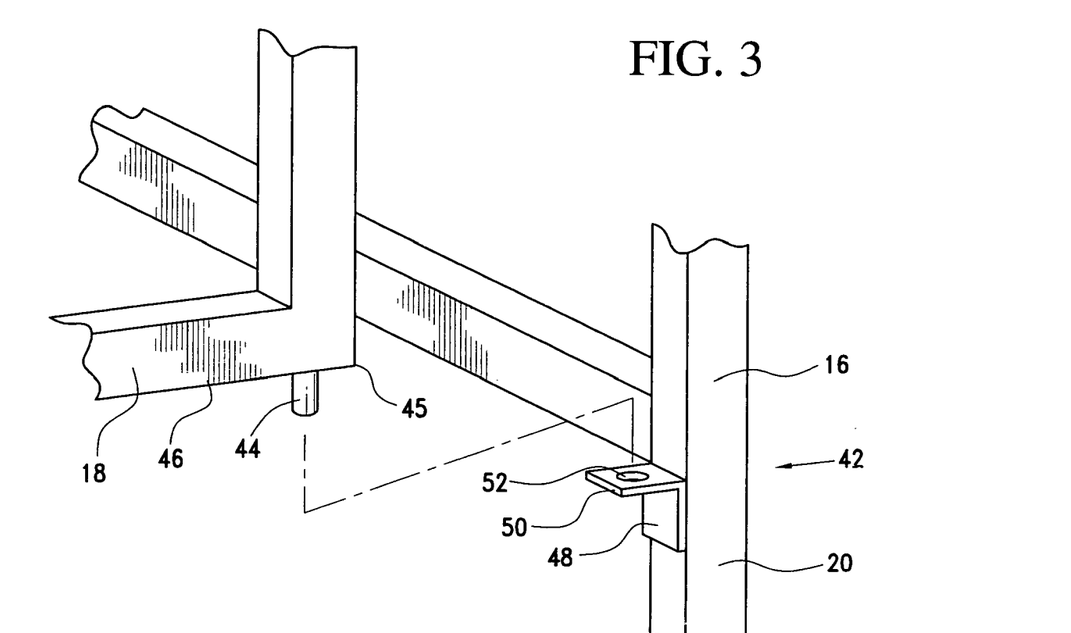
FIG. 3 is a partial cut away close up view of the circled area in FIG. 2 showing fastening elements at the bottom portions of the two side panels.

FIG. 2 shows the back panel 16 and the right side panel 18 ready to be assembled to one another using first and second fastening elements 42 and 43. The partial cutaway views of FIGS. 3–7 show the details of the fastening elements 42 and 43. FIG. 3 is a close up view of the circled area in FIG. 2 in which the bottom portion of the right side panel 18 is shown in position to be assembled to the back panel 16. The first fastening element 42 includes a vertical pin 44 that extends downwardly from a bottom corner 45 of a bottom horizontal frame tube 46 of the right side panel 18. An L-shaped plate 48 is attached to one of the vertical legs 20 on the back panel 16. The plate 48 includes a horizontal portion 50 that has an aperture 52 formed therein for reception of the pin 44.

Figure 4:
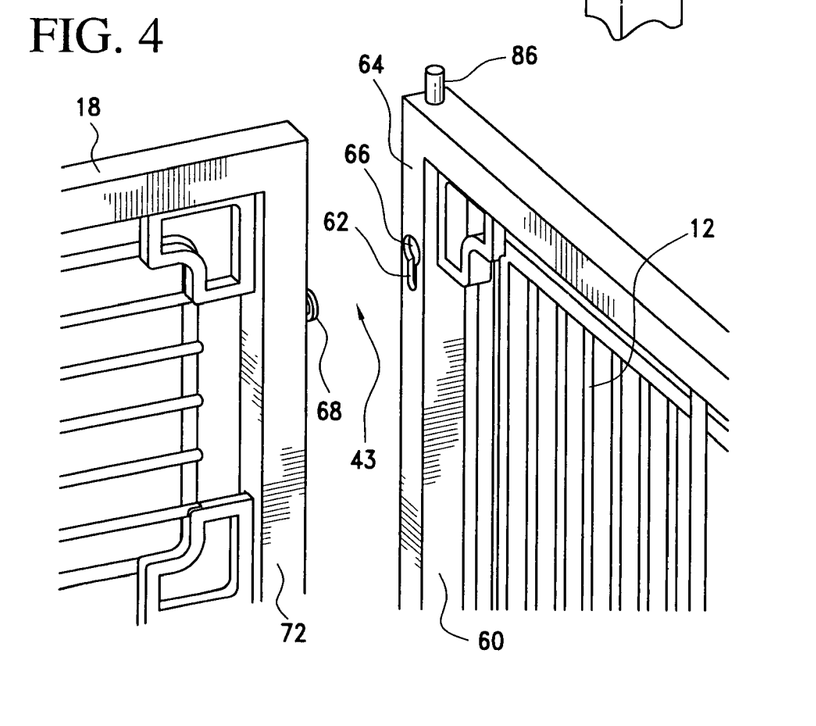
FIGS. 4 and 5 are opposing partial cut away perspective illustrations showing fastening elements near the top portions of two side panels of the cage ready to be assembled to one another.
Figure 5:
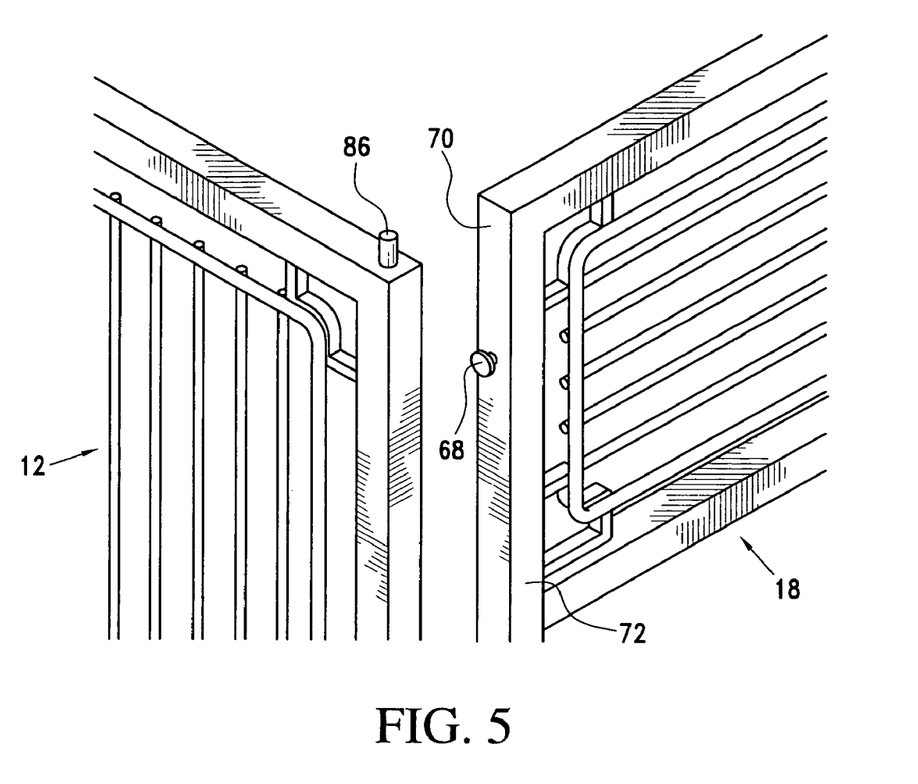

FIGS. 4 and 5 illustrate opposing views of top portions of the front and right side panels 12 and 18, again, just prior to assembly and showing one of the second fastening elements 43. As illustrated, the front panel 12 includes a vertical frame tube 60 which has a vertical key slot 62 cut into a backside 64 thereof. The key slot 62 includes an enlarged portion 66 that receives a headed pin, bolt or screw 68 that is affixed to a front side 70 of a vertical frame tube 72 on the right side panel 18.

It will be understood that although FIGS. 3–5 only show one of each type of fastening elements 42 and 43, there are actually four of each used, one of each at each corner of the cage 10. Thus, each of the front and back side panels 12 and 16 includes two of the key slots 62 and two of the L-shaped apertured plates 48 at opposite ends thereof, while each of the left and right side panels 14 and 18 includes two of the headed pins 68 and two of the vertical pins 44 at opposite ends thereof.

The forgoing arrangement enables each of the cage side panels to be secured to one another in the following manner. First, one of the vertical pins 44 on the left or right side panel 14 or 18 is partially inserted into the aperture 52 of the corresponding L-shaped plate 48 plate on the adjacent front or back panel 12 or 16. Next, the headed pin 68 is inserted into the large top portion 66 of the key slot 62 on the adjacent front or back panel 12 or 16 and then the left or right side panel 14 or 18 is moved down relative to the front or back panel 12 or 16, thereby securing both the pin 44 in the aperture 52 and the headed pin 68 in the key slot 62. It should be noted in this regard that the length of the vertical pin 44 is preferably selected to be long enough such that the pin 44 can be partially inserted in the aperture 52 when the headed pin 68 is lined up with the large top portion 66 of the key slot 62 to assist in the panel assembly process.

Figure 6:
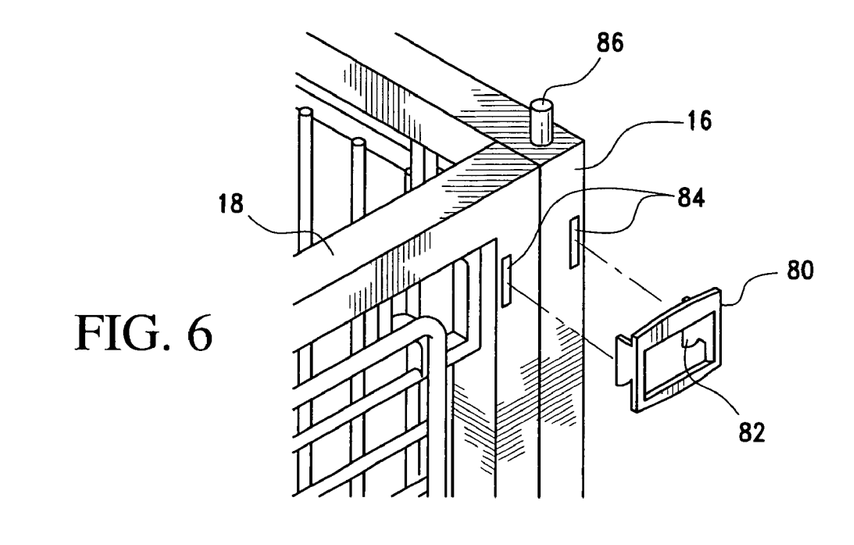
FIG. 6 is a partial cut away perspective illustration showing the top portions of two side panels of the cage after assembly and ready for reception of a locking clip that is employed to secure the side panels of the cage to one another.
Figure 7:
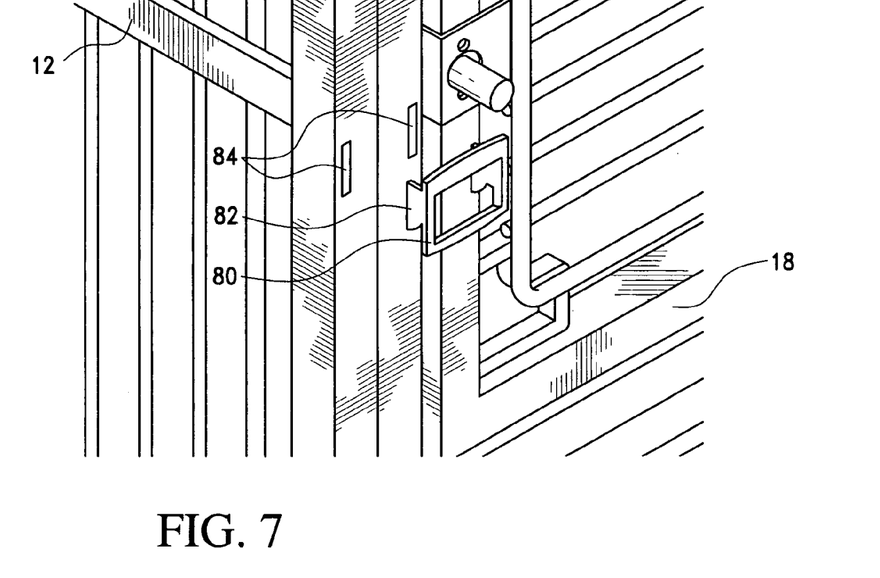
FIG. 7 is a partial cut away perspective illustration of the cage showing positioning of another of the locking clips to secure the side panels of the cage to one another.

With reference now to FIGS. 6 and 7, although the assembled panels will remain secure as long as the cage 10 is not lifted, a number of U-shaped locking clips 80 are preferably employed to prevent adjacent ones of the panels 12, 14, 16 and 18 from moving vertically relative to one another. Each of the clips 80 includes a pair of parallel legs 82, each of which fits into a corresponding one of first and second parallel vertical slots 84 that are formed in the vertical tubes 40 of the adjacent panels. As illustrated, the legs 82 are shaped such that the force of gravity will urge the legs 82 into locking engagement with the corresponding slots 84. FIGS. 6 and 7 show two different preferred locations for the locking clips 80. Preferably, two of the clips are employed to secure each pair of adjacent ones of side panels 12, 14, 16 and 18.

Returning once again to FIGS. 4–6, each of these shows one of four vertical pins 86 that are employed to positioning the top assembly 26 on the cage side assembly 11 in the same manner as is disclosed in the '424 patent in which the pins are received in corresponding apertures (not shown) in the underside of the top assembly 26.

Figure 8:
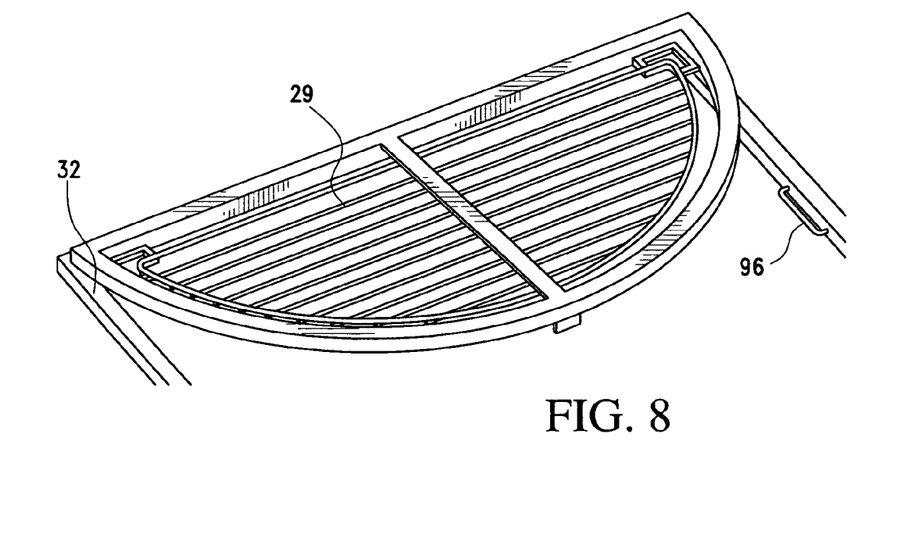
FIGS. 8 and 9 are partial cut away perspective illustrations showing a portion of the cage top assembly including a base frame and a folding end panel, with FIG. 8 showing the end panel folded down for storage or shipping and FIG. 9 showing the end panel folded up for assembly.
Figure 9:
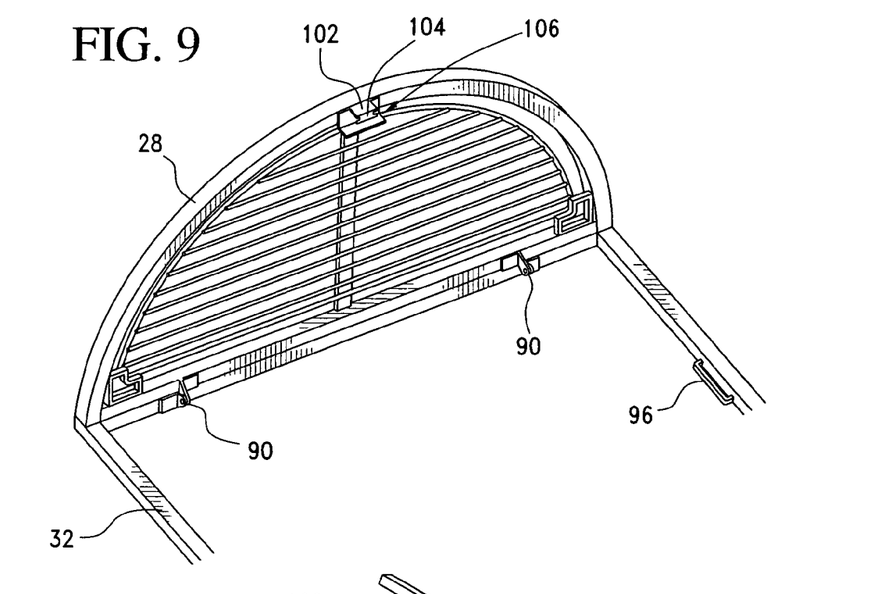

The present invention also preferably employs a unique arrangement for assembling the top assembly 26 of the cage 10 as illustrated in FIGS. 8–14. In the preferred embodiment, the first and second semicircular end panels 28 and 30 are each attached to opposite ends of the base frame 32 by means of a pair of hinges 90 as illustrated in FIG. 9 which allow the end panels 28 and 30 to be folded down for shipping or storage as illustrated in FIG. 8 and folded open for assembly as illustrated in FIG. 9.

Figure 10:
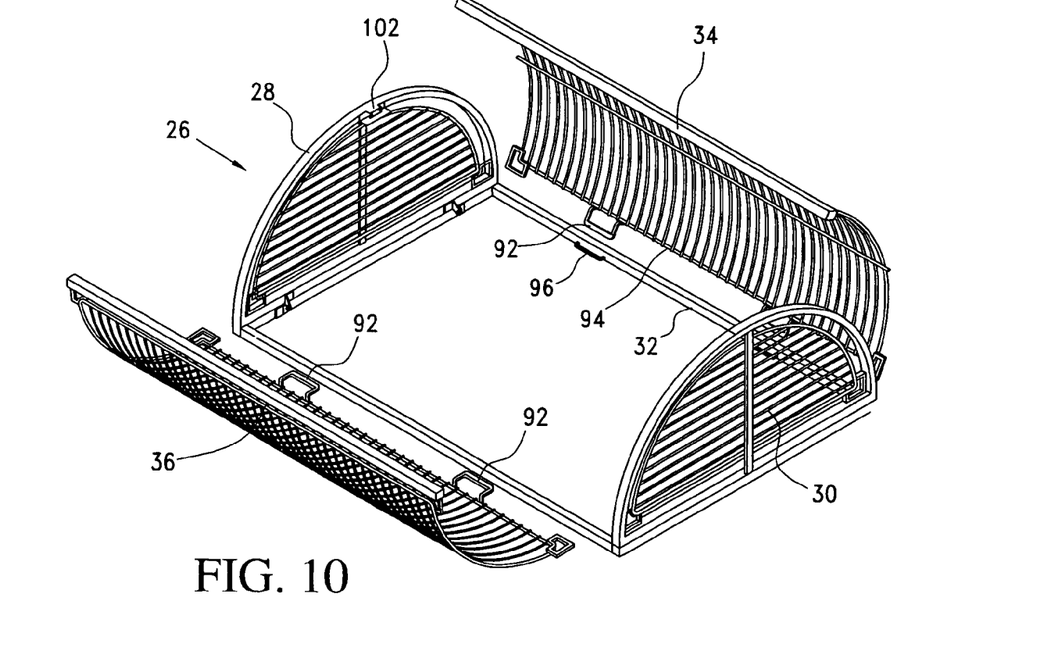
FIG. 10 is an exploded perspective illustration of the cage top assembly showing curved top panels ready for assembly to the base frame and end panels.
Figure 11:
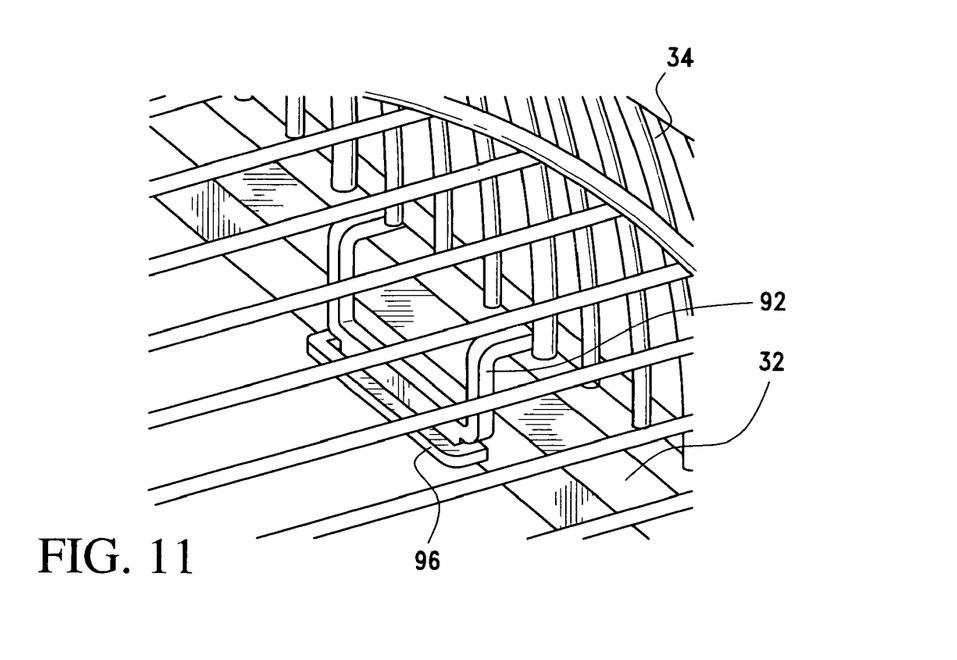
FIG. 11 is a partial cut away perspective illustration showing a securing clip arrangement for securing the curved top panels to the base frame of the cage top assembly.
Figure 12:
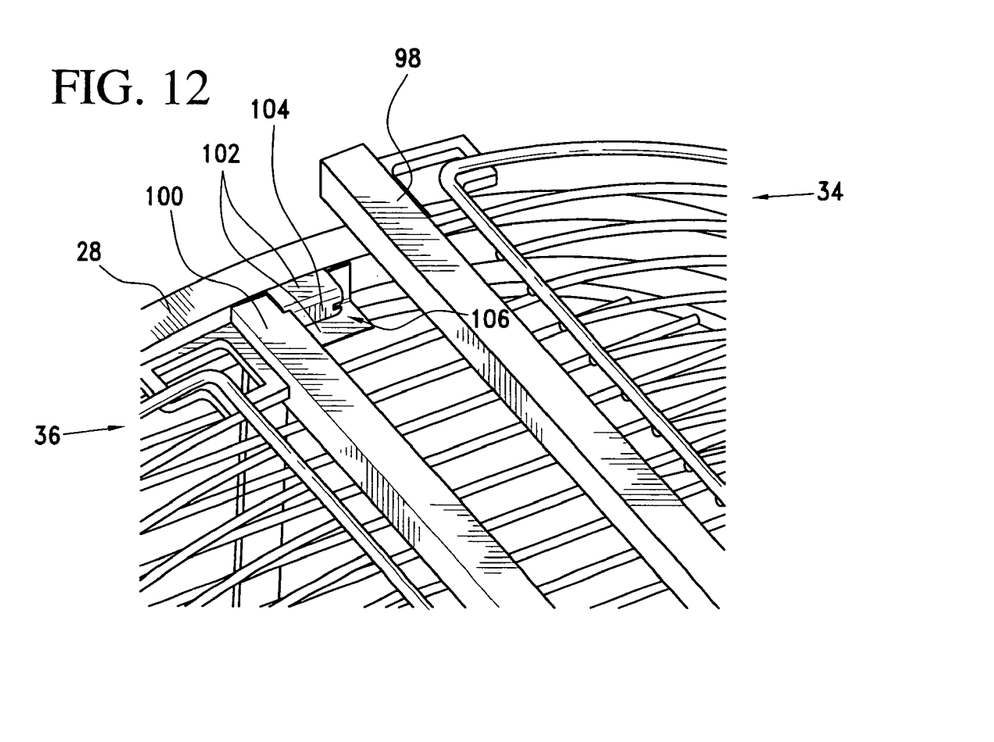
FIG. 12 is a partial cut away perspective illustration showing the cage top assembly including one of the curved top panels shown in position ready for assembly with a securing clip arrangement to the end panel.

As illustrated in FIGS. 10 and 11, the assembly of the curved top panels 34 and 36 to the base frame 32 begins by inserting each of a plurality of tabbed brackets 92 that are spaced along bottom ends 94 of the panels 34 and 36 into a corresponding one of a plurality of slotted tabs 96 that are attached to the base frame 32. Next, as illustrated in FIG. 12, the top ends of the curved top panels 34 and 36, each of which include a horizontal frame tube 98 and 100, respectively, are inserted into first and second U-shaped clips 102 (one shown) that are attached, one each, to the top of the first and second end panels 28 and 30. Each of the clips 102 includes a downwardly extending T-shaped tab 104 having first and second horizontal extensions 106 (see also FIG. 9) at the lower end thereof. Each of the horizontal frame tubes 98 and 100 includes a vertical slot 108 that receives a corresponding one of the tab extensions 106. When the curved top panels 34 and 36 are inserted into the U-shaped clips 32, the inherent dimensional tolerances in the panels 34 and 36 cause them to apply upward pressure on the U-shaped clips 32 which, in combination with the tab extensions 106 in the slots 108, insure a secure connection of the panels 34 and 36 to the rest of the elements of the top assembly 11.

Figure 13:
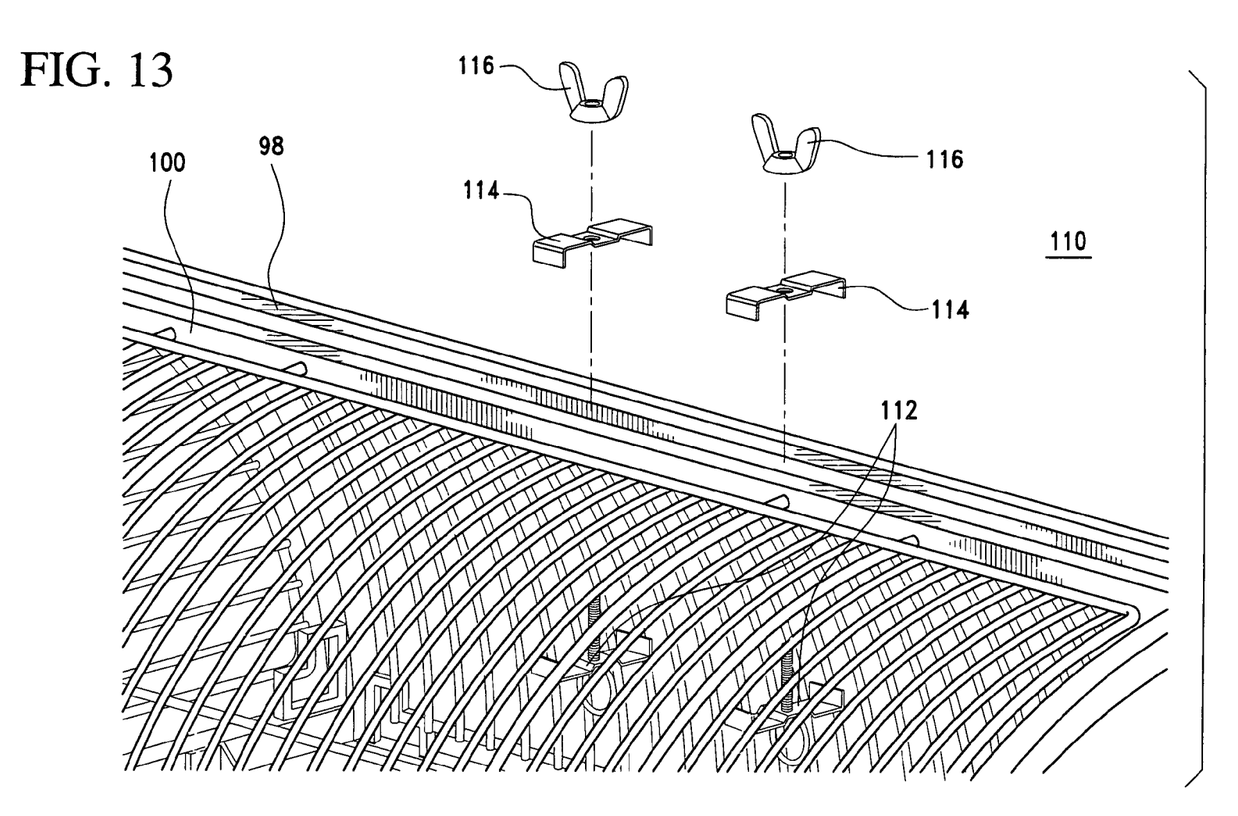
FIG. 13 is a partial cut away perspective illustration of the cage top showing an exploded view of fastening hardware employed to secure the curve top panels of the top assembly to one another.

With reference now to FIG. 13, a pair of clamping fasteners 110 is employed to secure the opposite top ends of the curved top panels 34 and 36 to one another. Each of the clamping fasteners 110 includes a combination screw/clamping plate/toy hanger 112, a second clamping plate 114 and a wing nut 116, which can be tightened by hand. In addition to providing a securing function, these assemblies thus serve a second function of supporting the pair of toy hangers inside the top of the cage 10.

Figure 14:
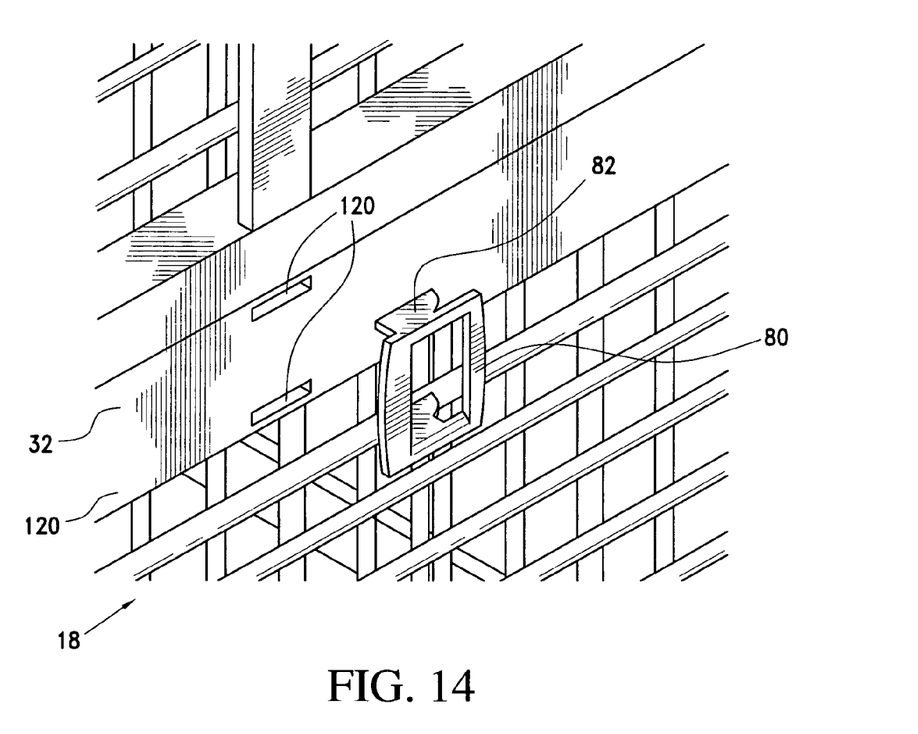
FIG. 14 is a partial cut away perspective illustration of the cage showing the positioning of another locking clip for securing the cage top assembly to the cage side panel assembly.

Finally, FIG. 14 shows the use of yet another one of the locking clips 80 to secure the cage top assembly 26 to the side assembly 11 by inserting the clip 80 in a pair of horizontal slots 120, one in the top assembly base frame 32 and the other in a top frame tube 122 of the right side panel 18. Although the top assembly 26 is heavy enough to stay in position on the side assembly by means of gravity, the use of the locking clips 80 is preferred to insure that the assemblies do not separate during moving of the assembled cage or in the event that the cage 10 is accidentally knocked over. Preferably, two of the clips 80 are employed, one at each end of the cage 10. Thus, a total of ten of the clips 80 are employed in the assembly of the cage, four at each end to secure the side panels to each other and one at each end to secure the top and side assemblies.

In conclusion, the present invention provides an inexpensive knockdown cage construction that facilitates easy assembly with no tools required, yet allows the cage to be collapsed for storage or shipping. In addition, once assembled, the cage is sturdy in spite of the fact that no fasteners are used in its assembly that require more than hand tightening.

Although the present invention has been disclosed in terms of a preferred embodiment and variations thereon, it will be understood that numerous additional modifications and variations could be made thereto without departing from the scope of the invention as defined by the following claims. For example, although the preferred embodiment combines the unique features of the side and top assemblies, it should be understood that each of the assemblies is unique in and of itself. Thus, for example, the top assembly could be used with the folding cage disclosed in the '424 patent, while the side assembly could be use with top assemblies of conventional or other construction.

What is claimed is:

1. A cage comprising:
   a side panel assembly including a plurality of side panels, each of said side panels being attached to adjacent ones of said side panels with at least first and second fastening elements, said first fastening elements including:
   a first pin extending from a first of said side panels; and
   an apertured plate extending from a second of said side panels for reception of said first pin; and
   said second fastening element including:
   a second, headed pin secured to one of said first and second side panels; and
   a key slot disposed in the other of said first and second side panels for reception of said second, headed pin.

2. The cage of claim 1, wherein each of said side panels includes a vertical slot in a vertical frame tube thereof and said side panel assembly further includes a locking clip having a first leg for insertion into one of said vertical slots in one of said side panels and a second leg for insertion into one of said vertical slots in an adjacent one of said side panels;
   whereby, said adjacent side panels are prevented from moving vertically relative to one another by said locking clip.

3. The cage of claim 1, wherein said first pin has a length that facilitates partial insertion of said pin into said aperture when said second, headed pin is inserted into an enlarged portion of said key slot.

4. The cage of claim 1, further including a top assembly disposed on said side assembly, said top assembly including:
   a base frame;
   first and second folding end panels pivotally attached to first and second ends, respectively, of said base frame, each of said folding end panels including a U-shaped securing clip disposed at a top thereof; and
   first and second top panels, each of said panels including at least one clip at a bottom thereof for securing said panel to said base frame and an upper frame tube having first and second ends for reception by said U-shaped securing clip on said first and second end panels, respectively.

5. The cage of claim 4, wherein said first and second end panels are semicircular in shape and said first and second top panels are curved such that said top assembly is in the shape of a half cylinder.

6. The cage of claim 4, wherein said upper frame tube of each of said top panels includes first and second slots, one adjacent each end thereof, which are positioned to receive a tab on said U-shaped securing clip for further securing said top panels to said first and second end panels.

7. The cage of claim 4, further including at least one clamping fastener assembly for clamping said upper frame tubes of said first and second top panels to one another.

8. The cage of claim 7, wherein said clamping fastener assembly includes a hanger depending from a bottom thereof for supporting a toy or other article inside said cage.

9. A cage comprising:
   a side panel assembly including a plurality of side panels, each of said side panels being attached to adjacent ones of said side panels; and
   a top assembly disposed on said side assembly, said top assembly including:
      a base frame;
      first and second folding end panels pivotally attached to first and second ends, respectively, of said base frame, each of said folding end panels including a U-shaped securing clip disposed at a top thereof; and
      first and second top panels, each of said top panels including at least one clip at a bottom thereof for securing said top panel to said base frame and an upper frame tube having first and second ends for reception by said U-shaped securing clip on said first and second end panels, respectively.

10. The cage of claim 9, wherein said first and second end panels are semicircular in shape and said first and second top panels are curved such that said top assembly is in the shape of a half cylinder.

11. The cage of claim 9, wherein said upper frame tube of each of said top panels includes first and second slots, one adjacent each end thereof, which are positioned to receive a tab on said U-shaped securing clip for further securing said top panels to said first and second end panels.

12. The cage of claim 9, further including at least one clamping fastener assembly for clamping said upper frame tubes of said first and second top panels to one another.

13. The cage of claim 12, wherein said clamping fastener assembly includes a hanger depending from a bottom thereof for supporting a toy or other article inside said cage.

14. The cage of claim 9, wherein said top and side assemblies each includes a horizontal slot in a horizontal frame tube thereof and said cage further includes a locking clip having a first leg for insertion into said horizontal slot in said top assembly and a second leg for insertion into said horizontal slot in said side assembly to thereby secure said top assembly to said side assembly.

15. A cage comprising:
   a side panel assembly including a plurality of side panels, each of said side panels being attached to adjacent ones of said side panels; and
   a top assembly disposed on said side assembly, said top assembly including:
      a base frame;
      first and second folding end panels pivotally attached to first and second ends, respectively, of said base frame, each of said folding end panels including a U-shaped securing clip disposed at a top thereof; and
      first and second top panels, each of said panels including at least one clip at a bottom thereof for securing said panel to said base frame and an upper frame tube having first and second ends for reception by said U-shaped securing clip on said first and second end panels, respectively, each said upper frame tube also including first and second slots, one adjacent each end thereof, which are positioned to receive a tab on said U-shaped securing clip for further securing said top panels to said first and second end panels; and
      at least one clamping fastener assembly for clamping said upper frame tubes of said first and second top panels to one another.

16. The cage of claim 15, wherein said first and second end panels are semicircular in shape and said first and second top panels are curved such that said top assembly is in the shape of a half cylinder.

17. The cage of claim 15, wherein said clamping fastener assembly includes a hanger depending from a bottom thereof for supporting a toy or other article inside said cage.

18. The cage of claim 15, wherein each of said side panels is attached to adjacent ones of said side panels with at least first and second fastening elements, said first fastening elements including:
   a first pin extending from a first of said panels; and
   an apertured plate extending from a second of said panels for reception of said first pin; and
   said second fastening elements including:
   a second, headed pin secured to one of said first and second panels; and
   a key slot disposed in the other of said first and second panels for reception of said second, headed pin.

19. The cage of claim 18, wherein each of said side panels includes a vertical slot in a vertical frame tube thereof and said fastening elements further include a locking clip having a first leg for insertion into one of said vertical slots in one of said side panels and a second leg for insertion into one of said vertical slots in an adjacent one of said panels;
   whereby, said adjacent panels are prevented from moving vertically relative to one another by said locking clip.

20. The cage of claim 18, wherein said first pin has a length that facilitates partial insertion of said pin into said aperture when said second, headed pin is inserted into an enlarged portion of said key slot.

* * * * *